United States Patent [19]
Borer et al.

[11] Patent Number: 5,395,025
[45] Date of Patent: Mar. 7, 1995

[54] METHOD AND APPARATUS FOR ANGLE CLEAVING RIBBON FIBER

[75] Inventors: Victor J. Borer, Austin; John W. Durham, Cedar Park, both of Tex.

[73] Assignee: Minnesota Mining and Manufacturing Company, St. Paul, Minn.

[21] Appl. No.: 38,500

[22] Filed: Mar. 29, 1993

[51] Int. Cl.⁶ .............................................. C03B 37/16
[52] U.S. Cl. .................................... 225/2; 225/96.5; 225/102
[58] Field of Search ...................... 225/2, 96, 96.5, 102

[56] References Cited

U.S. PATENT DOCUMENTS

| | | | |
|---|---|---|---|
| 3,934,773 | 1/1976 | Chinnock et al. | 225/2 |
| 4,202,475 | 5/1980 | Hirai et al. | 225/2 |
| 4,377,250 | 3/1983 | Muerkl et al. | 225/2 |
| 4,615,581 | 10/1986 | Morimoto | 350/96.21 |
| 4,695,126 | 9/1987 | Cook | 350/96.21 |
| 4,978,193 | 12/1990 | Tomita | 350/96.21 |
| 5,024,363 | 6/1991 | Suda et al. | 225/96 |
| 5,048,908 | 9/1991 | Blonder et al. | 385/39 |
| 5,062,682 | 11/1991 | Marazzi | 385/85 |
| 5,140,660 | 8/1992 | Takshaski | 385/79 |
| 5,188,268 | 2/1993 | Hakoun et al. | 225/96.5 |

FOREIGN PATENT DOCUMENTS 2046242 11/1980 United Kingdom .
2255335 11/1992 United Kingdom .

*Primary Examiner*—Hien H. Phan
*Attorney, Agent, or Firm*—Gary L. Griswold; Walter N. Kirn; Jack V. Musgrove

[57] ABSTRACT

A method and apparatus for imparting an angle cleave to a plurality of optical fibers. The cleaving device comprises a base having a support surface, the support surface having two lower pads which are aligned with two upper pads on a hinged cover, so that the fibers may be clamped between the respective pairs of lower and upper pads. One of the upper pads is designed to shift with respect to its corresponding lower pad; when a fiber is clamped between these pads and the upper pad moves, the fibers twist as a result of the induced torsional load. When the fibers are scored and cleaved while in the twisted state, the resulting end faces are at an oblique angle with respect to the fiber axes, which is beneficial since this reduces signal reflections at the fiber-to-fiber interfaces.

20 Claims, 3 Drawing Sheets

METHOD AND APPARATUS FOR ANGLE CLEAVING RIBBON FIBER

BACKGROUND OF THE INVENTION

1. Field of the Invention

The present invention generally relates to the interconnection of optical fibers, and more particularly to a method and apparatus for simultaneously cleaving the terminal ends of a plurality of optical fibers, and imparting an oblique angled finish to the terminal ends.

2. Description of the Prior Art

In recent years, fiber optic cables have replaced traditional copper wire as the preferred medium for telecommunications. As with copper wires, it is necessary to provide cross-connections and interconnections between optical fibers at various locations in the distribution system. This is typically accomplished with the use of an optical fiber connector or splice, but it is first necessary to prepare the terminal ends of the fibers being spliced. The prior art techniques for fiber preparation include cleaving the end of the fiber to provide a planar finish perpendicular to the fiber axis, which minimizes insertion losses associated with irregularities on the fiber end face. Early prior art cleaving devices were designed to cleave a single (discrete) fiber; later devices allow for the simultaneous cleaving of multiple fibers, for example, fibers which have been formed into a fiber ribbon. One such exemplary prior art cleaving device 1 is shown in FIG. 1, and is described in further detail in U.S. Pat. No. 5,024,363.

The prior art multi-fiber cleaver 1 is generally comprised of a base 2 having a support surface 3 for receiving the fibers, and a scribing wheel 4 which moves transversely with respect to the fiber axes. Support surface 3 includes a guide ramp 5 for receiving a fiber holder, and a pair of clamping pads 6. Pads 6 are aligned with another pair of pads 7 on a lid or clamp cover 8 which is hinged to an edge of support surface 3. The fibers to be cleaved are set on support surface 3, with their terminal ends overlying pads 6; the fibers are securely held in place between pads 6 and 7 when cover 8 is pushed against surface 3. Then, as scribing wheel 4 slides transversly along base 2, it produces a score line on each of the fibers. The cleaving operation is completed by pivoting an arm 9 downward, causing a pushing member or anvil 10 at the end of arm 9 to break the fibers at the score lines.

The prior art cleaver 1 simplifies the cleaving operation by making it possible to simultaneously cleave all of the fibers at once, and also ensures that each of the fibers is cleaved at the same relative location, i.e., the terminal portions of the fibers have the same length. It may be noted that this cleaver may be used for both fusion splicing and mechanical splicing. Fiber length is particularly important in both fusion and mechanical splices since the cleave length must be exact to avoid any offset of the fiber end faces, which would be detrimental to splice performance.

The prior art further recognizes that signal transmission may be improved by imparting an angled finish to the end face of the fibers. This construction results in reduced internal reflections of the signals at the end face. See, e.g., U.S. Pat. Nos. 4,615,581, 4,695,126, 4,978,193, 5,062,682 and 5,140,660. While each of these patents describes a ferrule-type connector, the same principle (minimizing reflections with an angled end face) equally applies to mechanical, butt-end splices.

The prior art includes appropriate techniques for imparting an angle cleave to the end face. For example, U.S. Pat. No. 5,048,908 illustrates a technique which requires that the fiber be placed under a torsional load; this technique is shown in FIG. 2. This prior art cleaving device 11 also has a base 12, lower clamping pads 13, upper clamping pads 14 and a scribing wheel or other cutting tool 15. Additionally, cleaver 11 includes a fiber holder or collet 16 which is rotatably supported, whereby collet 16 may be rotated and, consequently, the terminal end of the fiber is twisted. When a torque is so applied to the end of the fiber prior to the scoring operation, an angled end face results.

One problem that remains unsolved in this area is the cleaving of multiple fibers, such as are in a fiber ribbon, to impart an angle cleave on each of the fiber end faces. It is rather tedious, if not practically impossible, to use the technique of the '908 patent on each individual fiber in a ribbon, since this would require that the collet be successively placed about, and then removed from, each fiber; this also requires excessive manipulation of the ribbon which can lead to damaging one or more of the fibers. If any fiber in a ribbon becomes so damaged, or if any single fiber is not properly cleaved on the first try, then it may become necessary to re-cleave all of the fibers. This is due to the above-mentioned requirement that all of the fibers have the same predetermined length. It would, therefore, be desirable and advantageous to devise a cleaver similar to that of the '363 patent, which may simultaneously cleave a plurality of fibers, but which imparts an angle cleave to each of the fiber end faces. Unfortunately, it has heretofore been impossible or impractical to combine the teachings of the '363 and '908 patents. For example, it is not possible to simply use a single collet which would be simultaneously attached to the ends of all of the fibers. This configuration would tend to make the entire ribbon twist, as opposed to any individual fiber; it would also be rendered ineffective by the clamping of the fibers between the pads. Conversely, if the pads were removed or loosened, then twisting of the ribbon with a collet would cause some of the fibers to move away from the plane formed by the pads, and so the scribing wheel could not make a score line on each of the fibers in a single motion. Another combination of these techniques would require a plurality of collets, each being attached to one of the fibers in the ribbon after the ribbon has been secured to the cleaver. The fibers may be scored after each collet has been secured in a rotated position. It has, however, proven greatly impractical to provide suitable means to support such a configuration of collets (the close fiber spacing in a ribbon makes this even more difficult), and this technique would still require excessive manipulation of the fibers.

SUMMARY OF THE INVENTION

The present invention provides a device for simultaneously cleaving a plurality of optical fibers and imparting an angled end face to each of the fibers, the device generally comprising a base having a support surface with spaced apart clamping pads and a scribing wheel interposed between the pads, a cover hinged to the base at an edge of the support surface, the cover having clamping pads complementary to the pads of the support surface, and means for shifting one of the pads of the cover with respect to the corresponding pad on the support surface. The relative translational motion between the two pads places a torsional load on any fibers which are clamped therebetween, allowing them to twist slightly, but the continued clamping by the pads prevents any other movement of the fibers.

The pads are preferably shifted relative to one another by securing the top pad to a carriage which is slidably received in the cover, such as by a dovetail joint. The carriage is biased in one direction, and means are provided to forcibly urge the carriage in the opposite direction to exert the twisting force on the clamped fibers. The means may take the form of a screw having a conical end which is in contact with one end of the carriage. When the screw is turned, the conical end pushes against the carriage, forcing it to move toward the biasing element (a spring). The cleaver also includes a conventional hammer or anvil for breaking the fibers at the score lines.

BRIEF DESCRIPTION OF THE DRAWINGS

The novel features and scope of the invention are set forth in the appended claims. The invention itself, however, will best be understood by reference to the accompanying drawings, wherein:

DESCRIPTION OF THE PREFERRED EMBODIMENT

Figure 3:
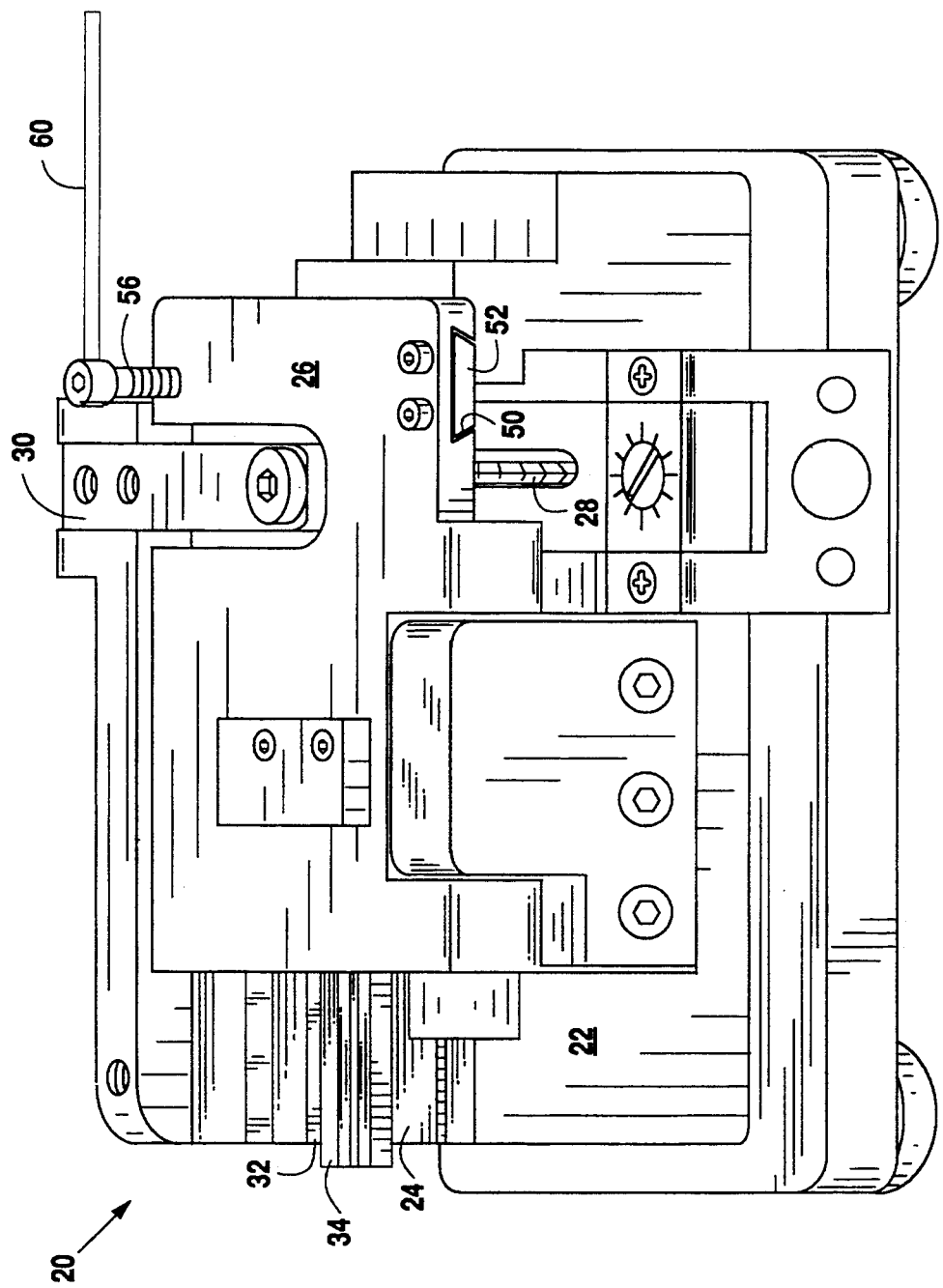
FIGS. 3 and 4 are front and right side perspective views of the optical fiber cleaving device of the present invention.
Figure 4:
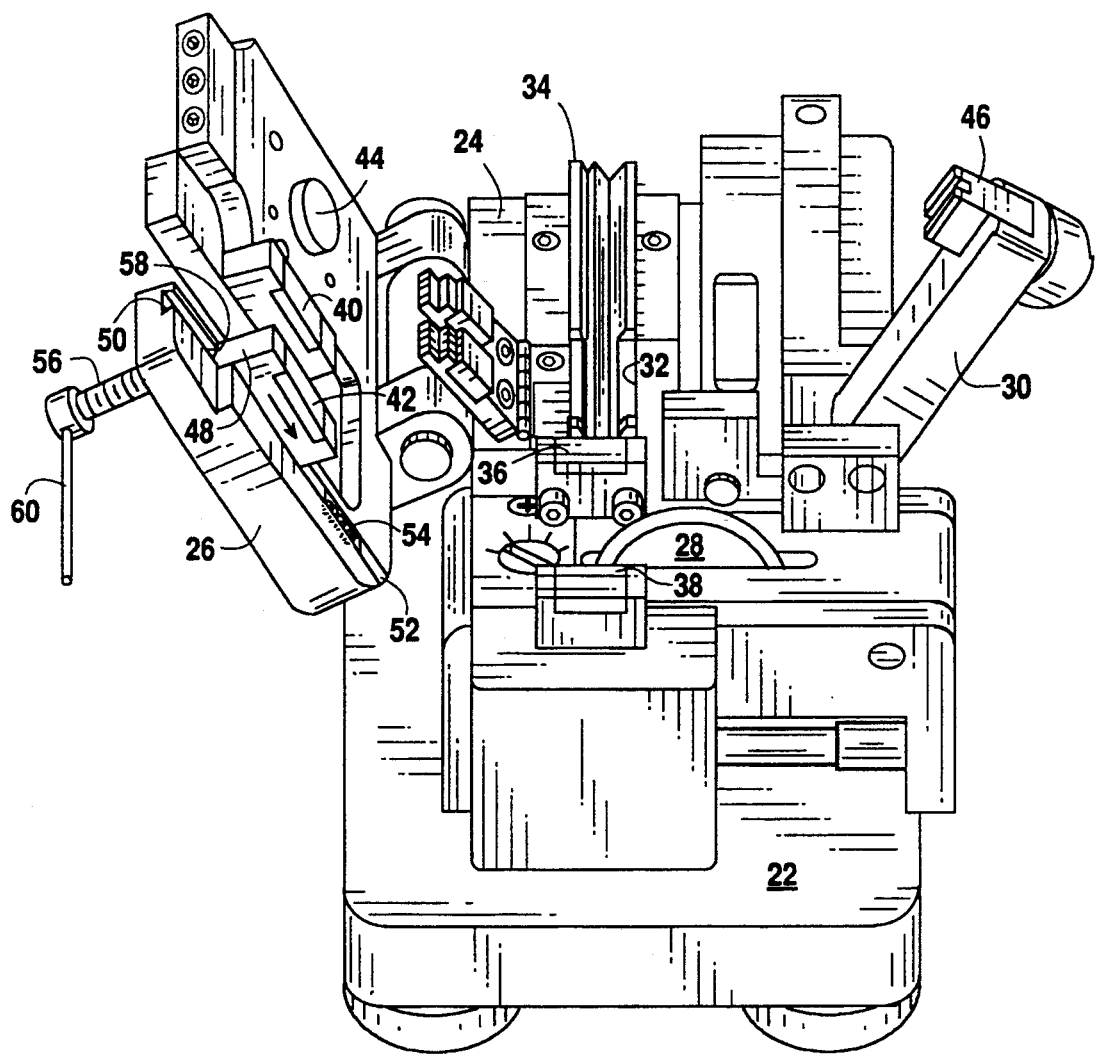

With reference now to the figures, and in particular with reference to FIGS. 3 and 4, there is depicted the multi-fiber cleaver 20 of the present invention. Cleaver 20 is similar to the prior art cleaver of FIG. 1, and generally comprises of a base 22 having an upper surface 24, a cover plate 26 hingedly attached to base 22 along an edge of surface 24, a cutting tool (scribing wheel) 28 slidably attached to base 22, and a hammer or arm 30 pivotally attached to base 22 along an edge of surface 24 opposite plate 26. Surface 24 has a guide ramp or track 32 for receiving a fiber holder 34. While FIGS. 3 and 4 depict a holder 34 for a discrete fiber, it is understood that this holder could be replaced with one designed to retain a fiber ribbon.

During the cleave operation, the terminal ends of the fibers are supported by two lower pads 36 and 38 mounted on surface 24 and positioned on either side of scribing wheel 28. Two upper pads 40 and 42 attached to cover plate 26 are located to forcibly abut pads 36 and 38, respectively, when plate 26 is moved to its closed position (FIG. 3). These pads hold the fibers in place, parallel and coplanar. It is thus important that the clamping surfaces of the lower pads themselves be coplanar, and that the upper pads be properly aligned with the lower pads to avoid misalignment of the fibers with respect to scribing wheel 28. A spring-loaded button 44 is also used to secure holder 34 in place during cleaving. Scribing wheel 28 is oriented generally perpendicular to the terminal ends of the fibers, and its size and location are such that its upper edge coincides with the plane defined by the upper surfaces of pads 36 and 38 whereby the edge of wheel 28 may contact and score any fibers held by the pads of cleaver 20. Arm 30 has a slotted push member or anvil 46 at its end for cleaving the fibers after they have been scored. The dimensions and position of arm 30 and anvil 46 are such that, when arm 46 is moved downward to its operative position (FIG. 3), anvil 46 is generally located between pads 36 and 38, and the slot in anvil 46 generally coincides with the line defined by the moving upper edge of scribing wheel 28, i.e., the slot is preferably centered on this line. For other details of cleaver 20, see U.S. Pat. No. 5,024,363 which is incorporated by reference.

Figure 1:
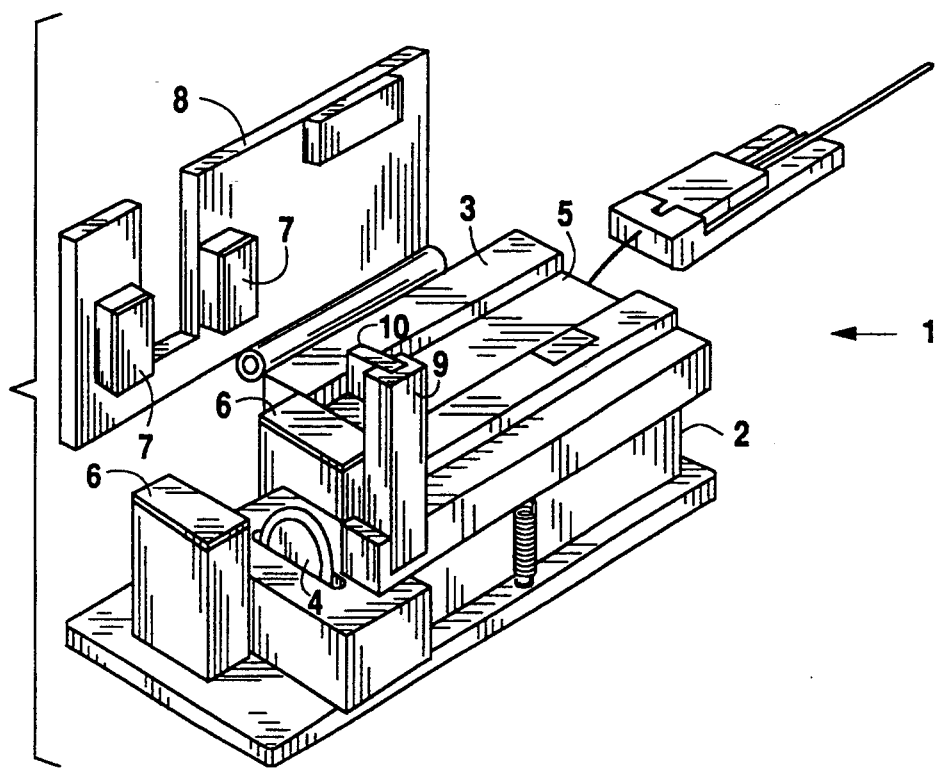
FIG. 1 is a perspective view of a prior art optical fiber cleaving device.

The primary difference between cleaver 20 and the prior art cleaver of FIG. 1 is the provision in cleaver 20 of means for moving one of the upper pads with respect to its corresponding lower pad when plate 26 is in its closed position. Specifically, in the presently preferred embodiment, pad 42 is slidably attached to plate 26 in such a manner that it can move slightly across pad 38, in a direction generally perpendicular to the terminal ends of the fibers. Pad 42 is preferably attached to plate 26 by means of a bar or carriage 48 which slides within a slot 50 in the underside of plate 26, the slot and carriage forming a dovetail joint. It is preferable to provide a relatively tight tolerance in the dovetail joint (less than about 10 $\mu$m) to avoid transverse movement of the carriage while it is clamping the fibers. Pad 42 is received in a cavity of carriage 48. A plug or stop member 52 is fixed to plate 26 in one end of slot 50 to prevent carriage 48 from completely sliding out through that end of the slot. Stop 52 also serves as a backing for a spring 54 which biases carriage 48 (and pad 42) toward the other end of slot 50 (its relaxed position), where a screw 56 passes through plate 26 into slot 50. The tip 58 of screw 56, which abuts one end of carriage 48, is conical or beveled, and the end of carriage 48 is chamfered, such that clockwise rotation of screw 56 and its resulting downward movement causes carriage 48 to recede as tip 58 moves into forcible contact with the chamfered end of carriage 48. A stop (not shown) may be provided to limit the rotation of screw 56, thereby limiting movement of pad 42. In the preferred embodiment, maximum rotation of screw 56 results in pad 42 moving about 30-70 $\mu$m. A small rod 60 may be attached to screw 56 to provide a handle to facilitate turning of the screw.

Figure 2:
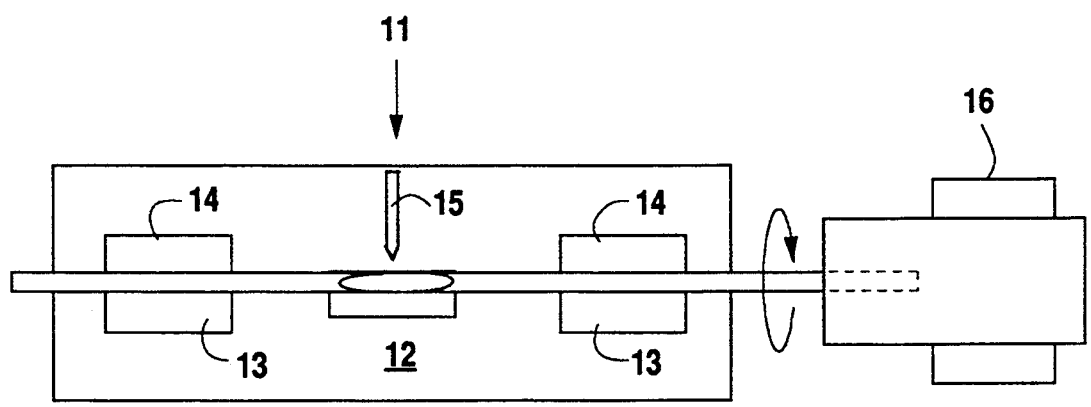
FIG. 2 is a schematic representation of a prior art cleaving technique wherein the single fiber is placed under a torsional load.
Figure 5:
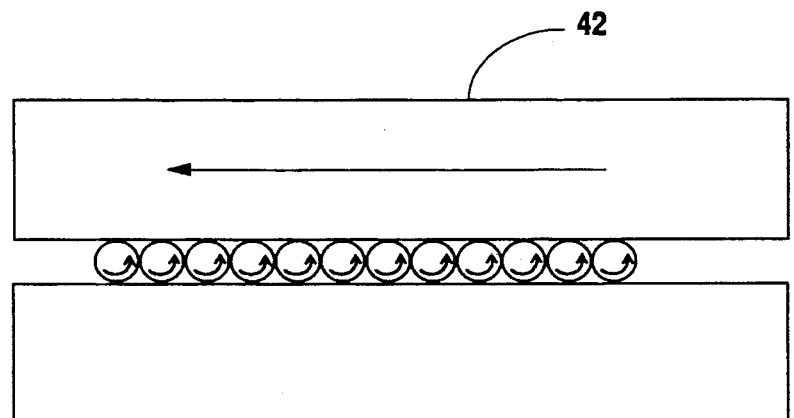
FIG. 5 is a schematic representation of the technique used according to the present invention to simultaneously induce the torsional load on all of the fibers in a fiber ribbon.

The effect of the relative motion between one pair of pads is illustrated in FIG. 5. When the terminal ends of the fibers are forcibly clamped between pads 38 and 42, moving either of the pads results in placing each of the fibers under a torsional load. Since the fibers are also being clamped by pads 36 and 40, the fibers twist as a result of the torque, as indicated by the arrows in FIG. 5. The amount of twist may vary depending upon the size of the fibers and the relative movement between the pads; however, assuming a standard fiber diameter (125 $\mu$m) and the aforesaid 30-70 $\mu$m shifting of the pads, this twists the fibers about 3°-20°, allowing for slippage of the fibers. If the fibers are scored and cleaved while in the twisted state, the resulting end faces of the fibers are disposed at an oblique angle (typically 3°-10°) with respect to the fiber axes, as opposed to a right angle, similar to the cleaving operation of FIG. 2. It may be noted that, in addition to being angled, the end face of each fiber is helical, rather than flat, but this is merely an incidental result which is ancillary to the primary goal of providing fibers with an angle cleave. Those skilled in the art will also appreciate that this method of cleaving leads to a "protruding defect" on the end face of one of the two end faces resulting from the cleave of a single fiber; the other end face has a complementary rounded edge. Cleaver 20 should be used in such a manner that the protruding defect is created on the stub fiber which is discarded after cleaving. This object is achieved by shifting pad 42 forward, that is, in the direction indicated by the arrow in FIG. 4, assuming that the fibers enter the cleaver from the left side, as shown in FIGS. 3 and 4.

The materials of cleaver 20 are not particularly critical, although it is important to provide pads having an appropriate hardness which allows them to firmly grip and twist the fibers. The pads are thus preferably formed of an elastomeric material having a Shore A hardness in the range of 50–80. The remaining components of cleaver 20 may be formed from any durable material, preferably a metal such as aluminum or stainless steel.

Operation

Operation of cleaver 20 is relatively simple. Prior to cleaving, however, the fiber(s) must be properly prepared. If the fibers are in the form of a ribbon which is part of a bundled group of ribbons in a cable, then a portion of the cable jacket must be cut back to reveal the ribbons. Most cables have several protective layers, e.g., the ribbons are first surrounded by a thermal wrap, then an inner sheath, then a polyester tape layer, followed by an outer sheath, with one or more intervening layers of strength members (i.e., aramid fibers). Each of these layers must be removed to provide access to the fiber ribbons. Similar steps must be taken to remove the protective layers of a cable having a single discrete fiber. If a plurality of discrete fibers are to be interconnected, the craftsperson may optionally join the discrete fibers in a ribbon format, such as by using the FIBRLOK 2670 multifiber ribbon construction tool sold by Minnesota Mining and Manufacturing Co. (3M-assignee of the present invention; FIBRLOK is a trademark of 3M).

After the ribbon has been so exposed (or formed from discrete fibers), the terminal end of the ribbon should be cleaned, and the fibers stripped. The minimum strip length is the distance from the outside of pad 38 to the outside of pad 42 which, in the preferred embodiment, is about 20 mm. Stripping may be simplified by using the multi-fiber stripping tool shown in U.S. Pat. No. 4,850,108. This tool strips away the bonding material of the ribbon as well as the buffer coatings on each of the individual fibers. Any debris should be cleaned off the fibers using a lint-free cloth. The stripped fibers are then ready for cleaving. They are placed on support surface 24, either manually or by means of fiber holder 34, overlying pads 36 and 38. Plate 26 is lowered into its closed position, clamping the fibers at the two locations between pads 36 and 40, and pads 38 and 42, respectively. The pads should also be clean and free of any debris. A visual inspection may confirm that the fibers are properly positioned and taut. Handle 60 is moved the desired amount, shifting upper pad 42 and placing each of the fibers under a torsional load. The fibers are then scored by sliding scribing wheel 28 forward, and cleaved by pushing anvil 46 against the fibers. Prior to removing the fibers from cleaver 20, the craftsperson may inspect the fibers to confirm that the end faces on all fibers are acceptable, i.e., that they are clean cleaves with no spikes. The fiber viewer disclosed in U.S. patent application Ser. No. 07/763,192 may be used for this purpose. Once the craftsperson is satisfied that each of the fibers has an acceptable end face, the fibers may be removed from the cleaver, and inserted into an appropriate connection device, such as the FIBRLOK Multi-Fiber Optical Splice sold by 3M (see U.S. Pat. No. 5,151,964). In order to minimize insertion losses, the fibers should be inserted so that the orientation of the angled end faces of one set of fibers complement the orientation of the angled end faces of the other set of fibers, i.e., the end faces of a given pair of fibers to be spliced are preferably parallel to each other when spliced. This will naturally occur with proper use of the system presuming that carriage 48 moves the same direction each time a set of fibers is cleaved. If this procedure is followed, the core-to-core separation between respective fiber pairs in the splice will be nearly equal to the minimum core-to-core separation in splice of fibers having flat (orthogonal) end faces.

Cleaver 20 present clear advantages over the prior art. In addition to creating high-performance splices, due to the significant reduction in reflections at the angled end faces, cleaver 20 greatly simplifies the cleaving process for both single and multiple fibers. In the case of a single fiber cleave, it is much simpler to turn handle 60 and thereby induce the torsional load than to attach and manipulate the collet of the prior art device of FIG. 2. In the case of multiple fibers, cleaver 20 provides a quick and easy method of simultaneously cleaving all of the fibers in a ribbon, and all at the same length.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, means could be provided to shift lower pad 38 instead of upper pad 42, or to shift both the upper and lower pads simultaneously. Also, cleaver 20 could easily be used to angle cleave single (discrete) fibers, although it is particularly suited for angle cleaving of multiple fibers. Of course, cleaver 20 may still be used to make flat cleaves, by simply refraining from shifting pad 42 during the cleave operation. It is therefore contemplated that such modifications can be made without departing from the spirit or scope of the present invention as defined in the appended claims.

We claim:

1. A method of angle cleaving the terminal end of an optical fiber, comprising the steps of:

obtaining a cleaving device having a base, said base having a support surface, said support surface having first and second spaced apart pads, said base further having a cover member movable between open and closed positions and including third and fourth pads which forcibly abut said first and second pads, respectively, when said cover member is in said closed position;

placing the optical fiber on said first and second pads while said cover member is in said open position;

moving said cover member to said closed position, thereby clamping said fiber between said first and third pads, and said second and fourth pads, respectively;

shifting said fourth pad with respect to said second pad to induce a torsional load on the terminal end of the fiber; and cutting the fiber while it is under said torsional load.

2. The method of claim 1 wherein said fourth pad is affixed to a carriage which is slidably attached to said cover member, and said shifting step is accomplished by sliding said carriage along said cover member.

3. The method of claim 2 wherein said cover member further has means for biasing said carriage toward a relaxed position, and said sliding of said carriage is accomplished by forcibly urging said carriage against said biasing means.

4. A device for imparting an angle cleave to the faces of the terminal ends of a plurality of optical fibers, comprising:

a base member having a support surface;

means for clamping the plurality of fibers to said support surface;

means for simultaneously twisting the terminal ends of each of the fibers; and means for scoring each of the fibers proximate their terminal ends.

5. The device of claim 4 wherein said clamping means further maintains the terminal ends of the fibers generally parallel and coplanar.

6. The device of claim 4 wherein said twisting means is integrally formed with said clamping means.

7. The device of claim 4 wherein:

said support surface of said base member has first and second pad members thereon; and said clamping means includes a plate member attached to said base proximate said support surface and movable between open and closed positions, said plate member having third and fourth pad members positioned thereon whereby, when said plate member is in said closed position, said third pad member forcibly abuts said first pad, and said fourth pad member forcibly abuts said second pad.

8. The device of claim 4 further comprising means for holding the fibers, said support surface having a guide track therein for slidably receiving said fiber holding means.

9. The device of claim 4 wherein said twisting means comprises:

at least one pad member; and means for supporting said pad member proximate said support surface, said supporting means further providing means for sliding said pad member relative to support surface.

10. The device of claim 7 wherein said scoring means comprises a scribing wheel slidably mounted on said base.

11. The device of claim 7 further comprising hammer means for pushing said fibers proximate score lines formed by said scoring means.

12. The device of claim 7 wherein said fourth pad member is attached to a carriage member, said carriage member further being slidably received in said plate member.

13. The device of claim 9 wherein:

said supporting means comprises a cover plate having a carriage member slidably received therein; and said pad member is attached to said carriage member.

14. The device of claim 12 wherein said plate member has a slot therein, said carriage member residing in said slot, and said slot and carriage member forming a dovetail joint.

15. The device of claim 12 further comprising means for biasing said carriage member toward a relaxed position.

16. A device for imparting an angle cleave to the face of a terminal end of an optical fiber, comprising:

a base having a support surface, said support surface having first and second pads spaced apart;

a cover member attached to said base, said cover member being movable between open and closed positions and including third and fourth pads which forcibly abut said first and second pads, respectively, when said cover member is in said closed position;

means for shifting said fourth pad with respect to said second pad such that any fiber clamped therebetween will be placed under a torsional load; and means, attached to said base and located between said first and second pads, for scoring the fiber.

17. The device of claim 16 wherein said fourth pad is affixed to a carriage, said carriage being slidably attached to said cover member.

18. The device of claim 17 further comprising means for biasing said carriage toward a relaxed position.

19. The device of claim 17 wherein said cover member has a slot therein for receiving said carriage, said slot and carriage forming a dovetail joint.

20. The device of claim 18 further comprising means for moving said carriage against said biasing means.

* * * * *